United States Patent

Schmelmer

(10) Patent No.: US 10,022,761 B2
(45) Date of Patent: Jul. 17, 2018

(54) FORMING DEVICE FOR PLASTICALLY FORMING A COMPONENT

(71) Applicant: Schechtl Maschinenbau GmbH, Edling (DE)

(72) Inventor: Matthias Schmelmer, Pfaffing (DE)

(73) Assignee: SCHECHTL MASCHINENBAU GmbH, Edling (DE)

( * ) Notice: Subject to any disclaimer, the term of this patent is extended or adjusted under 35 U.S.C. 154(b) by 278 days.

(21) Appl. No.: 14/698,462

(22) Filed: Apr. 28, 2015

(65) Prior Publication Data

US 2015/0314351 A1 Nov. 5, 2015

(30) Foreign Application Priority Data

Apr. 29, 2014 (EP) .................................. 14166447

(51) Int. Cl.
| | |
|---|---|
| *B21D 55/00* | (2006.01) |
| *B21C 31/00* | (2006.01) |
| *G01V 8/10* | (2006.01) |
| *F16P 3/14* | (2006.01) |

(52) U.S. Cl.
CPC .............. *B21C 31/00* (2013.01); *B21D 55/00* (2013.01); *F16P 3/144* (2013.01); *G01V 8/10* (2013.01)

(58) Field of Classification Search
CPC .......... B21D 5/004; B21D 5/006; B21D 5/02; B21D 5/0272; B21D 5/042; B21D 55/00; B30B 15/285; F16P 3/14; F16P 3/144; G08B 13/183; B21C 31/00; G01V 8/10; G01V 8/12
See application file for complete search history.

(56) References Cited

U.S. PATENT DOCUMENTS

| | | | | |
|---|---|---|---|---|
| 4,249,074 A | * | 2/1981 | Zettler | .................... F16P 3/144 |
| | | | | 250/221 |
| 5,253,498 A | | 10/1993 | Benedict | |
| 6,243,011 B1 | * | 6/2001 | Rostroem | ................ B21D 5/02 |
| | | | | 250/559.12 |

(Continued)

FOREIGN PATENT DOCUMENTS

| | | |
|---|---|---|
| DE | 19717299 A1 | 2/1998 |
| DE | 10164002 A1 * 7/2003 | ............... B21D 5/04 |

(Continued)

OTHER PUBLICATIONS

Translation EP 2633925, Sep. 4, 2013.*

*Primary Examiner* — Edward Tolan
(74) *Attorney, Agent, or Firm* — Barlow, Josephs & Holmes, Ltd.

(57) ABSTRACT

The invention relates to a forming device (10) for plastically deforming a component (54), in particular a sheet component, with a top part (12) of the forming device (10) and with a bottom part (14) of the forming device (10), between which the component (54) is fixable and deformable by a relative movement (20) between the bottom part (14) and the top part (12), with a machine rack (22) accommodating the top part (12) and the bottom part (14), which bounds a working area (28) of the forming device (10), in which the component (54) is deformable, at least in certain areas, and with a sensor device (40) for non-contact monitoring the working area (28) at least in certain areas by means of radiation (42) capable of being emitted by the sensor device (40).

14 Claims, 3 Drawing Sheets

(56) References Cited

U.S. PATENT DOCUMENTS

| | | | | |
|---|---|---|---|---|
| 6,389,860 B1* | 5/2002 | Stalzer | ............... | B21D 55/00 |
| | | | | 192/134 |
| 9,089,888 B2* | 7/2015 | Patuzzi | ............... | B21D 5/0272 |
| 9,346,091 B2* | 5/2016 | Hufnagel | ............... | B21D 5/02 |
| 2004/0070751 A1* | 4/2004 | Bergbach | ............... | F16P 3/144 |
| | | | | 356/141.3 |
| 2005/0161591 A1* | 7/2005 | Bergbach | ............... | G01V 8/10 |
| | | | | 250/221 |
| 2010/0220184 A1* | 9/2010 | Appleyard | ............... | B21D 55/00 |
| | | | | 348/86 |

FOREIGN PATENT DOCUMENTS

| | | | |
|---|---|---|---|
| EP | 1522784 A1 | 4/2005 | |
| EP | 1589355 A1 * | 10/2005 | ............... G01V 8/20 |
| EP | 2633925 A1 | 9/2013 | |

\* cited by examiner

FORMING DEVICE FOR PLASTICALLY FORMING A COMPONENT

BACKGROUND OF THE INVENTION

The invention relates to a forming device for plastically deforming a component, in particular a sheet component, according to the preamble of claim 1.

In forming components, in particular metallic semi-finished products or sheet components, as is known—according to the type of the forming process, for example, swing-folding machines or pressing machines are used as the forming device for plastically deforming the respective components. Depending on the material characteristics, such as for example the E-modulus or the hardness of the respective component, it can be subjected to compressive, tensile, shear or bending forming according to the type of the forming method, wherein especially components formed of a metal are particularly suitable for the just mentioned forming methods. According to the field of employment, for example steel, aluminum, copper or alloys such as brass can be used as materials for the component intended for the forming process. Besides the metallic materials, other materials such as for example plastics can also be formed. Usually, very high forces act in forming, which can result at least in severe contusions or even in separation of limbs in accidents with person involvement.

In order to avoid injuries of the operating personnel of such forming devices, usually, protective systems such as proximity sensors, light barriers or the like are employed, by means of which shutoff of the forming device is effected as soon as these protective systems are activated or triggered.

Such a protective system can already be taken as known from EP 1 522 784 A1. The protective system there is provided on respective retaining arms on a top tool of a bending device configured as a bending press and includes multiple light barriers, which are disposed to each other such that they form a volumetric protective field, which at least partially surrounds a section around the top tool. In penetrating this protective field, the top tool of the bending press is stopped to protect the operating personnel from injuries.

However, herein, disruption in the working process can also occur by unintended penetration of the protective field and therewith in unintended standstill of the forming device.

BRIEF SUMMARY OF THE INVENTION

It is the object of the invention to provide a forming device for plastically deforming a component, in particular a sheet component, by means of which a disruption in the working process can be avoided an additionally the operating personnel can be effectively protected from injuries in particularly simple and inexpensive manner.

This object is solved by a forming device having the features of the present invention. Advantageous configurations with convenient developments of the invention are specified and discussed in detail below.

A forming device according to the invention for plastically deforming a component, in particular a sheet component, includes a top part and a bottom part, between which the component is fixable and deformable by a relative movement between the bottom part and the top part, and a machine rack accommodating the top part and the bottom part, which bounds a working area of the forming device at least in certain areas, in which the component is deformable, as well as a sensor device for non-contact monitoring the working area at least in certain areas by means of radiation capable of being emitted by the sensor device. Therein, the sensor device has at least one emitter component, by means of which the radiation can be emitted into the working area through at least one emitter opening in the machine rack, wherein the emitter opening is disposed in an area of a pivot point of the relative movement between the bottom part and the top part. While protective systems and associated sensors are provided on the top tool in solutions known from the prior art, the sensor device according to the invention is disposed outside of the working area of the forming device and thus does not present an obstacle to the component to be processed in the working area. Accordingly, the radiation is passed through the working area from the outside in an in particular presettable horizontal and vertical distance to the pivot point of the relative movement. Thereby, only the area of the forming device actually to be protected from manual intervention is protected, whereby the probability of unintentionally triggering safety-related shutoff of the forming device can be reduced to a minimum. Thus, it is advantageous e.g. in forming devices configured as bending machines to especially protect the pivot point of the relative movement by means of the radiation emitted by the sensor device with respect to manual interventions of the operating personnel. Especially in the area of this pivot pint, the risk of injury is particularly high since the component deforming under the relative movement between the top part and the bottom part is particularly severely deformed in the area of the pivot point, there is an acute risk of contusing and thus the risk of injury is particularly high in this zone. The advantageous arrangement of the emitter opening allows monitoring the working area without parts of the sensor device such as the emitter component having to be disposed in the working area and thereby standing in the way in loading the forming device with the component. In other words, individual components of the sensor device do not penetrate the working area and thus do not disturb the execution of the usual working steps since the radiation is passed through the emitter opening.

In particular, the emitter component can be disposed on an emitter side of the machine rack facing away from the working area of the forming device.

However, adjusting the vertical distance and the horizontal distance still exhibits a further advantage, which is substantiated in the detection of the forming process. Thus, adjusting the respective distances from the pivot point can for example be effected such that a certain forming state of the component can be detected by its at least partial coverage of the radiation in forming and thereby by reduction the radiation intensity. Accordingly, e.g. with an adversely extending bending line of the component to be formed, deviation of the radiation intensity from a nominal intensity can be detected, wherein the nominal intensity corresponds to a desirable extension of the bending line. Thus, with too severe attenuation of the radiation as a result of distortions along the bending line blocking the radiation too much, scrap (e.g. a deformed and thus deficient bending line due to cavities or due to another material inhomogeneity) can be detected. It is clear that the vertical distance and the horizontal distance should have a particularly low distance value to the bending line for this, but which is also of particular advantage with regard to the protection of the forming device with respect to manual interventions dangerous to the operating personnel since unintended interruption of the forming process can be largely excluded by this particularly close distance setting.

It is even conceivable that the diameter of the radiation bounds the protective area in the working area, i.e. that an individual sensor ray with a certain diameter penetrates the working area and shutoff of the forming device or interruption of the forming process is effected upon at least partial interruption and attenuation of the radiation resulting from it. The forming device comprises an emitter component disposed on an emitter side of the machine rack facing away from the working area, by means of which the radiation can be emitted into the working area through an emitter opening in the machine rack and through the working area in an adjustable vertical distance as well as in a horizontal distance to a pivot point of the relative movement between the bottom part and the top part.

In order to particularly adequately bound the working area and to confer a sufficiently high stiffness to the forming device with material expenditure as low as possible and thus in particularly inexpensive manner, the machine rack includes a first lateral part laterally bounding the working area and at least one second lateral part laterally bounding the working area in an advantageous embodiment of the invention, which are disposed to sides of the working area respectively opposing each other. The side of the first lateral part facing away from the working area could for example correspond to the emitter side, on which the emitter component of the sensor device is accommodated. Thus, the sensor device and e.g. an electric motor driving the forming device and optionally a transmission (e.g. a gear transmission) driven thereby can be protected by a single common cover, whereby the number of covers to be removed in maintenance works can accordingly be reduced to a minimum, which are to be disassembled to get to all of the components to be maintained—to which the sensor device also belongs.

In a further advantageous development of the invention, the sensor device has at least one receiver component, which is disposed on a receiver side of the second lateral part opposing the emitter side of the machine rack, facing away from the working area. By disposing the receiver component outside of the working area, it can—similarly as also the emitter component—particularly effectively be protected from damages as they can e.g. be caused by inserting, forming or removing the component to be formed. For example, if a sheet to be bent is inserted into the forming device as the component, thus, impact of the sheet on the receiver component is particularly simply prevented by the arrangement thereof on the side facing away from the working area.

It can also be advantageous if the radiation capable of being emitted by the emitter component can be received by means of the receiver component through a receiver opening aligned with the emitter opening, which is disposed on the second lateral part. Therein, the emitter opening and the receiver opening can especially be dimensioned in their cross-section such that unimpeded emission or reception of the radiation through the respective openings is allowed. Thus, it is also largely excluded that damage to the emitter component by partial penetration of components to be formed—e.g. in loading the forming device with the components—occurs since respective opening cross-sections can be dimensioned as small as possible. In other words, by aligning the receiver opening with the emitter opening, both openings can be formed particularly small and with particularly low cross-section, which further decreases the risk of damage to the sensor device.

In a further advantageous development of the invention, as the vertical distance, the distance between a bending track of the bottom part and the radiation is adjustable. The bending track presents a particularly suitable reference, based on which the vertical distance can be adjusted since the bending track or the shape thereof directly defines the bending line of the component to be formed and thereby the area of the working area particularly dangerous to the operating personnel.

Furthermore, it is advantageous if the radiation is formed as light radiation, in particular as laser radiation. Monitoring the working area by means of the light radiation and in particular laser radiation offers a particularly sophisticated and reliable possibility of protecting the operating personnel from injuries since interruption of the radiation—e.g. compared to ultrasound-based sensor devices—can be particularly fast detected. Therein, the use of a laser, thus focused light, is even less prone to malfunction—e.g. with respect to the lighting conditions or possible reflections in the area around the forming device—than a conventional light source, which has a lower radiation intensity than the laser radiation.

In a further advantageous embodiment of the invention, the forming device is switchable from an operating state into at least one state different from the operating state depending on an optical path of the radiation. The optical path describes the geometrical extension of rays. Therein, the optical path also considers the diameter of the radiation. If the optical path is varied in forming, thus, e.g. deflected or partially covered, thus, the forming device can e.g. be switched into a slower operating mode depending on this variation. Deflection or partial coverage of the optical path can indicate a certain degree of bending of the component, wherein partial coverage of the optical path e.g. by formed areas of the component to be formed can occur. In this case, the forming device can for example be switched into a slower operating state, as soon as a certain degree of bending of the component is detected e.g. by the coverage of the optical path and accordingly approach to a desired final state of the forming movement is effected.

It is of further advantage if the forming device can be shut off with an interruption of the optical path. Shutting off is particularly meaningful if the optical path is suddenly interrupted since this indicates penetration of foreign bodies, to which e.g. limbs of the operating personnel of the forming device also belong, into the working area.

In a further advantageous embodiment, the forming device includes a computing device, by means of which a signal dataset delivered by the sensor device depending on the optical path can be received and evaluated. By means of the computing device, a particularly reliable evaluation of the variation of the optical path can be effected since the associated signal dataset allows statement about the type of an at least partial interruption of the optical path or deflection of the optical path. Accordingly, it could also be evaluated by means of the computing device, from which direction coming the optical path is interrupted or covered in certain areas. Thus, it can be differentiated based on the computing device, if limbs of the operating personnel have penetrated the area of risk of the forming device or if a coverage of the optical path in certain areas is caused by a possible warp of the component to be formed protruding into the optical path.

It is of further advantage if the forming device can be switched into an emergency stop state by means of the computing device. Switching into an emergency stop state offers particularly extensive protection from injuries. Thus, for increasing the safety, it can be provided that—as soon as the forming device is switched into the emergency stop state—an emergency stop switch distant from the working area is to be actuated to resume the normal operation.

Therein, the person responsible for the emergency stop state, who e.g. has interrupted the optical path, necessarily has to depart from the area of risk to again deactivate the emergency stop state of the forming device. This circumstance offers a particularly great safety for the operating personnel.

Finally, it is advantageous if the forming device is formed as a swing-folding machine. A swing-folding machine has a particularly narrowly bounded area of risk in the working area thereof. The area of risk is substantially limited to the area around the bending line of the component to be formed, wherein the monitoring by means of the sensor device and thus by means of the radiation is particularly suitable to ensure particularly high operating safety with at the same time minimum risk of disruption. This risk of disruption in particular relates to an unintended interruption of the forming process, e.g. as a result of unintended interruption of the radiation or of the optical path in passing the forming device by the operating personnel.

The features and feature combinations mentioned above in the description as well as the features and feature combinations mentioned below in the description of figures and/or shown in the figures alone are usable not only in the respectively specified combination, but also in other combinations or alone without departing from the scope of the invention.

BRIEF DESCRIPTION OF THE DRAWINGS

Further advantages, features and details of the invention are apparent from the claims, the following description of an embodiment of the invention as well as based on the drawings.

There show.

DETAILED DESCRIPTION OF THE INVENTION

Figure 1:
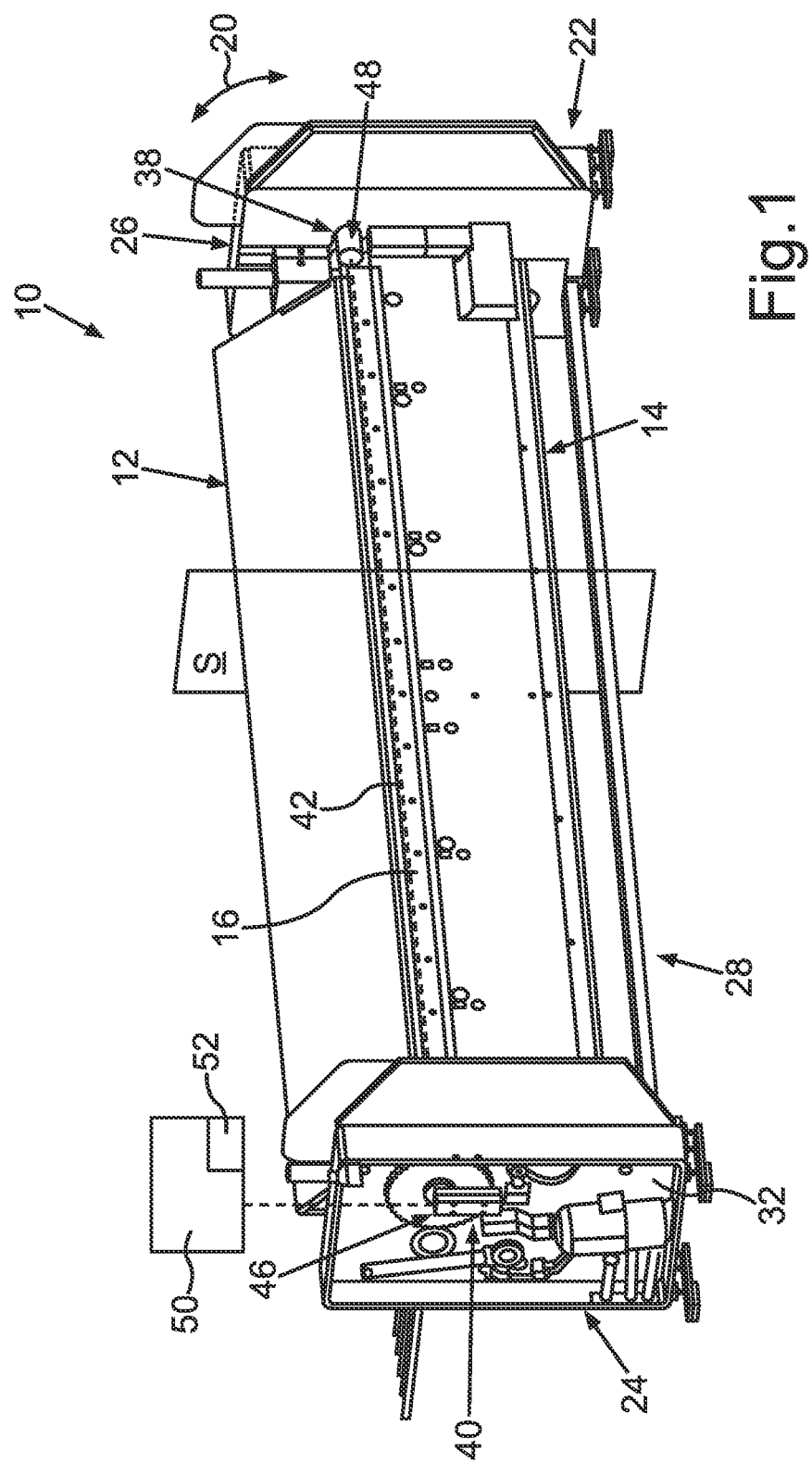
FIG. 1 a perspective view of a forming device according to the invention formed as a swing-folding machine with a machine rack, on which a top part and a bottom part of the forming device are supported, wherein an emitter component of a sensor device for monitoring a working area of the forming device is disposed on the machine rack.
Figure 2:
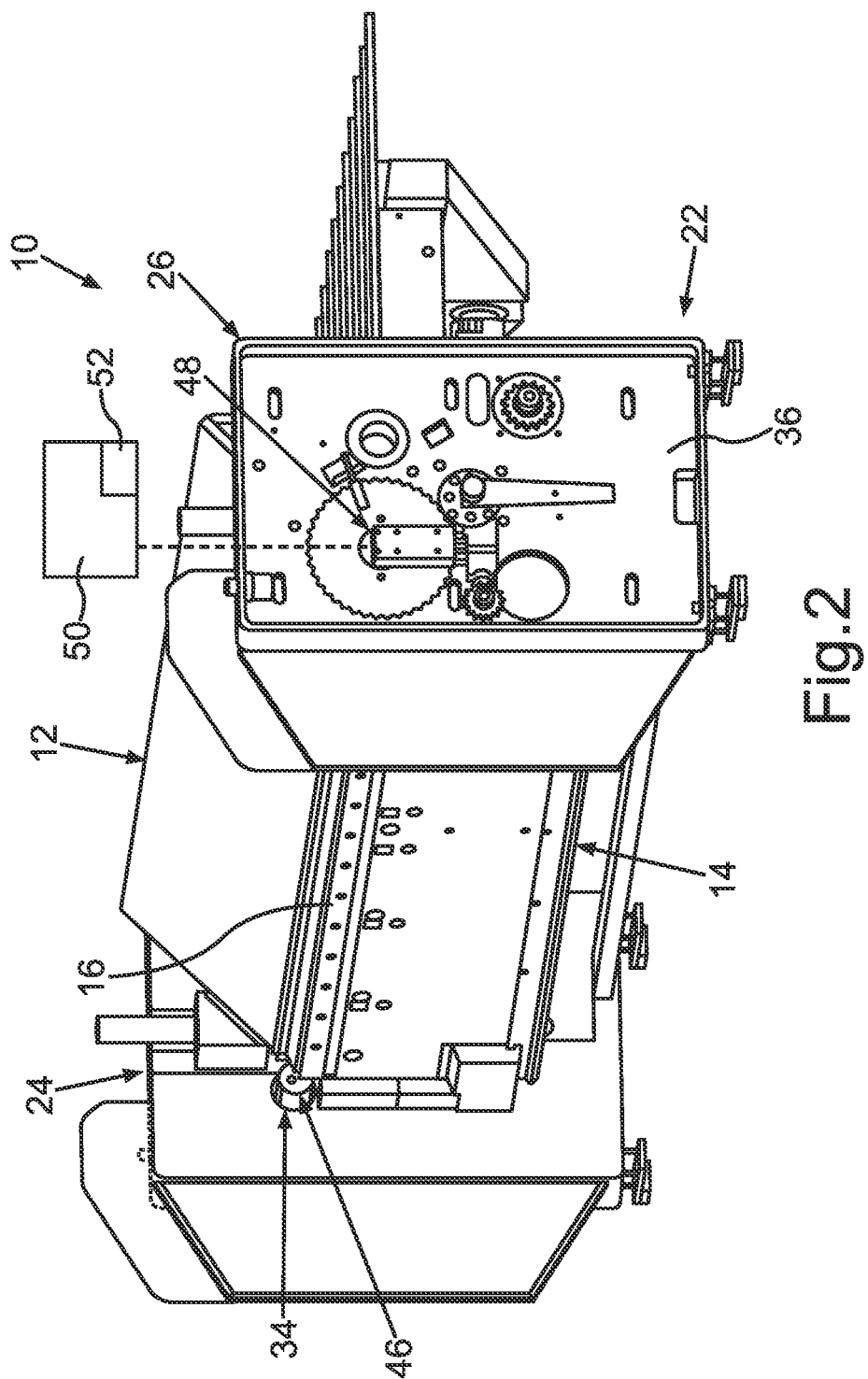
FIG. 2 a further perspective view of the forming device already shown in FIG. 1, wherein a receiver component of the sensor device for receiving radiation emitted by the emitter component is disposed on the machine rack.

FIG. 1 and FIG. 2 show in respective perspective views a forming device 10 formed as a swing-folding machine. The forming device 10 has a top part 12 and a bottom part 14, which are pivotable to each other corresponding to a relative movement 20 illustrated by a double arrow. Presently, the top part 12 and the bottom part 14 are accommodated in a machine rack 22, wherein the machine rack 22 bounds a working area 28 of the forming device 10 at least in certain areas. The forming device 10 furthermore includes a sensor device 40 for non-contact monitoring the working area 28 at least in certain areas by means of radiation 42 capable of being emitted by the sensor device 40 or by means of an emitter component 46 of the sensor device 40. Presently, this radiation 42 is formed as laser radiation, according to which the emitter component 46 is accordingly configured as a laser transmitter. The emitter component 46 of the sensor device 40 is disposed on an emitter side 32 of the machine rack 22 facing away from the working area 28. By means of the emitter component 46, the radiation 42 can be emitted through an emitter opening 34 in the machine rack 22 into the working area 28. The machine rack 22 has a first lateral part 24 laterally bounding the working area 28 and at least one second lateral part 26 laterally bounding the working area 28, which are disposed to sides of the working area 28 respectively opposing each other. In other words, the working area 28 thus is between the first lateral part 24 and the second lateral part 26 of the forming device 10.

As is in particular apparent from FIG. 2, the sensor device 40 has at least one receiver component 48, which is configured as a laser receiver and which is disposed on a receiver side 36 of the second lateral part 26 opposing the emitter side 32 of the machine rack 22, facing away from the working area 28. By means of the receiver component 48, the radiation 42 capable of being emitted by the emitter component 46 can be received through a receiver opening 38 aligned with the emitter opening 34, which is disposed on the second lateral part 26.

Figure 3A:
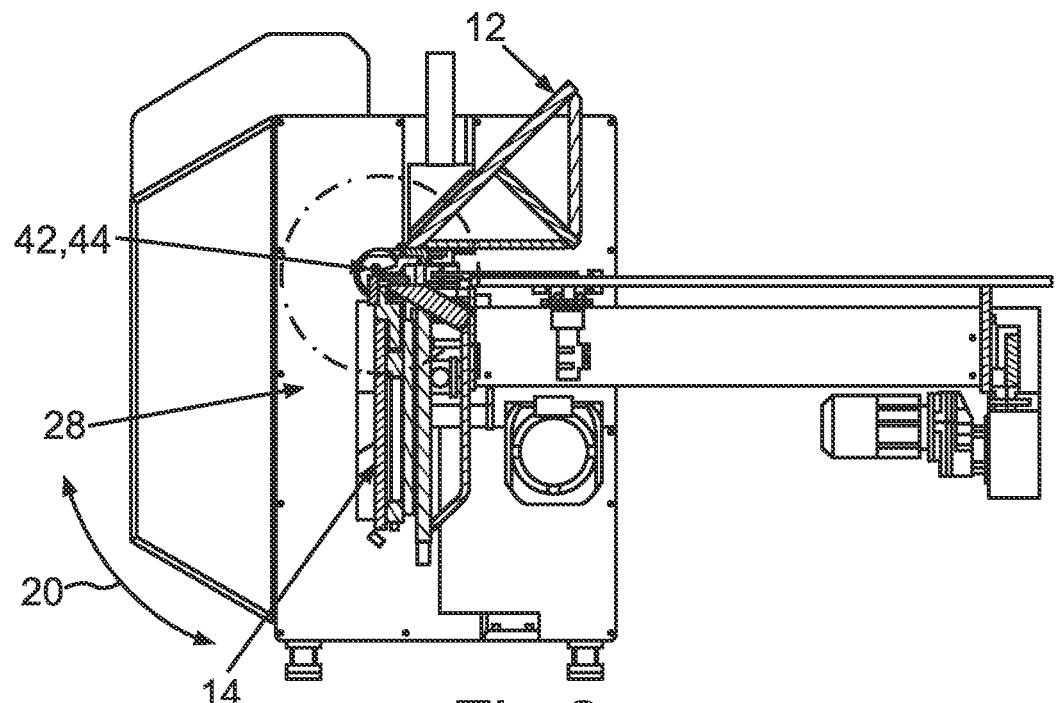
FIG. 3a a sectional view of the forming device illustrated in FIG. 1 corresponding to a sectional plane S indicated in FIG. 1; and in FIG. 3b a detailed view of an area B marked in FIG. 3a, wherein it is shown that radiation emitted by the sensor device can be emitted into the working area through an emitter opening in the machine rack and through the working area in an adjustable vertical distance as well as in an adjustable horizontal distance to a pivot point of a relative movement between the bottom part and the top part.
Figure 3B:
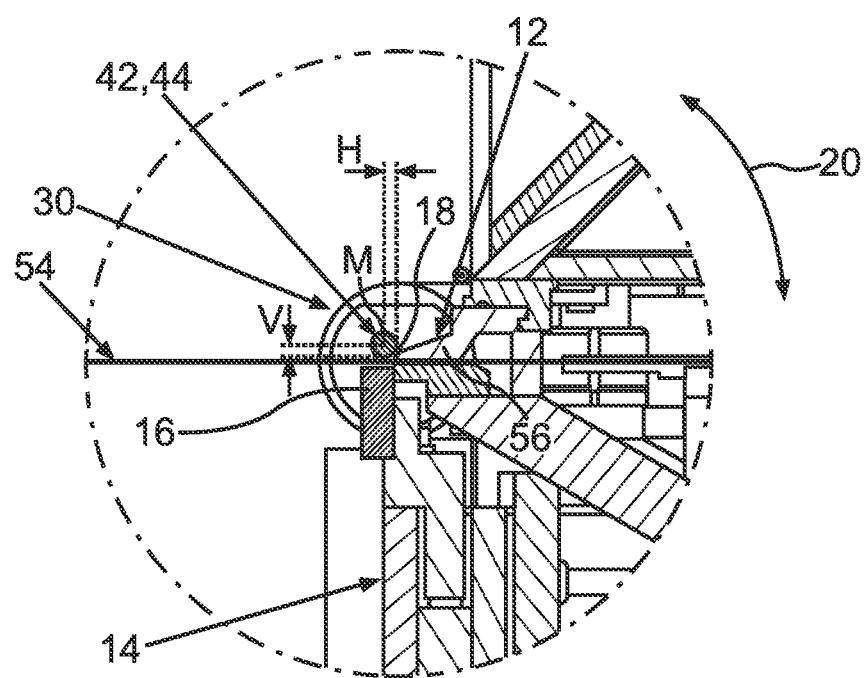

FIG. 3a shows a sectional view of the forming device 10 illustrated in FIG. 1 corresponding to a sectional plane S indicated in FIG. 1. FIG. 3b shows an enlarged detailed view of an area B marked in FIG. 3a.

From the synopsis of FIG. 3a and FIG. 3b, it is recognizable that the forming device 10 has a bending track 16 on its bottom part 14, which is used for forming (here: bending) a component 54 fixable between the top part 12 and the bottom part 14. In forming the component 54, the relative movement 20 is effected as a pivoting movement between the bottom part 14 and the top part 12 about a pivot point 18. Presently, the pivot point 18 extends through an edge facing the bending track 16 of a tapered front part 56 of the top part 12. The radiation 42 can be emitted through the working area 28 in an adjustable vertical distance V as well as in a horizontal distance H to the pivot point 18 of the relative movement 20 between the bottom part 14 and the top part 12. The radiation 42 is passed through a bending beam band of the forming device 10 not indicated in more detail, wherein the radiation 42 presently passes through the working area 28 corresponding to the drawing plane offset left to the pivot point 18 as well as above the pivot point 18. Presently, the horizontal distance H corresponds to the horizontal distance between the pivot point 18 (and thereby the edge of the front part 56 of the top part 12) and a center M of the radiation 12. In contrast, the vertical distance V corresponds to the distance between the bending track 16 of the bottom part 14 and the center M of the radiation 12. An optical path 44 of the radiation 12 bounds an area of risk 30 of the working area 28. Therein, the optical path 44 corresponds to the geometrical extension of the radiation 12 through the working area 28, whereby the optical path 44 defines a diameter of the radiation 42 on the one hand and possible deflections of the radiation 42 in passage through the working area 28 on the other hand. The area of risk 30 corresponds to a partial area of the working area 28, in which particularly great risk of injury for the operating personnel of the forming device 10 exists. In order to avoid an injury—for example by clamping limbs between the top part 12 and the bottom part 14 in the area of the pivot pint 18—of the operating personnel of the forming device 10, the forming device 10 can be shut off with interruption of the optical path 44 or switched at least from a normal operating state, in which the forming device 10 performs a bending operating in normal speed, into a state different from the normal operating state, in which forming is e.g. extremely slowly effected and there is thus sufficient time for the operating personnel to move possible body parts out of the area of risk 30. By adjusting the vertical distance V and the horizontal distance H, therein, a particularly specific monitoring of the working space 28 only limited to the area of risk 30 can be effected, whereby disruptions in the forming process can be largely prevented. Thus, there is barely the risk anymore that the forming process is interrupted if the operating personnel e.g. only passes the forming device 10 or stays in the remaining, but harmless area of the working area 28 different from the area of risk 30. For reliably monitoring the forming device 10, it includes a computing device 50 coupled to the sensor device 40 and thus to the emitter component 46 and the receiver component 48 in signal transmitting manner, by means of which a signal dataset 52 delivered by the sensor device 40 depending on the optical path 44 can be received and evaluated. The forming device 10 can be switched into an emergency stop state by means of the computing device 50 by triggering emergency shutoff by the computing device 50 upon interruption of the optical path 44 by means of the signal dataset 52 characteristic to the interruption.

The invention claimed is:

1. A forming device for plastically deforming a sheet component, comprising:
   a top part of the forming device and a bottom part of the forming device, between which the component is fixable and deformable by a relative movement between the bottom part and the top part;
   a machine rack accommodating the top part and the bottom part, which bounds a working area of the forming device, in which the component is deformable, at least in certain areas; and
   a sensor device for non-contact monitoring the working area at least in certain areas by radiation capable of being emitted by the sensor device, wherein the sensor device has at least one emitter component, by which the radiation can be emitted into the working area through at least one emitter opening in the machine rack, wherein the emitter opening is disposed in an area of a pivot point of the relative movement between the bottom part and the top part, wherein in forming the component, the relative movement is a pivoting movement between the bottom part and the top part about the pivot point, wherein the emitter component is disposed on an emitter side of the machine rack facing away from the working area.

2. The forming device according to claim 1, wherein the emitter opening is disposed in an adjustable vertical distance (V) as well as in an adjustable horizontal distance (H) to the pivot point.

3. The forming device according to claim 1, wherein the machine rack includes a first lateral part laterally bounding the working area and at least one second lateral part laterally bounding the working area, which are disposed to sides of the working area respectively opposing each other.

4. The forming device according claim 1, wherein the sensor device has at least one receiver component, which is disposed on a receiver side of a second lateral part opposing the emitter side of the machine rack, facing away from the working area.

5. The forming device according to claim 1, wherein the sensor device has at least one receiver component, which is disposed on a receiver side of a second lateral part opposing the emitter side of the machine rack, facing away from the working area and wherein the radiation capable of being emitted by the emitter component can be received by the receiver component through a receiver opening aligned with the emitter opening, which is disposed on the second lateral part.

6. The forming device according to claim 1, wherein the distance between a bending track of the bottom part and the radiation is adjustable as the vertical distance (V).

7. The forming device according to claim 1, wherein the radiation is formed as light radiation.

8. The forming device according to claim 1, wherein the forming device is switchable from an operating state into at least one state different from the operating state depending on an optical path of the radiation.

9. The forming device according to claim 1, wherein the forming device is switchable from an operating state into at least one state different from the operating state depending on an optical path of the radiation and wherein the forming device can be shut off with an interruption of the optical path.

10. The forming device according claim 1, wherein the forming device is switchable from an operating state into at least one state different from the operating state depending on an optical path of the radiation and wherein the forming device includes a computing device, by which a signal dataset delivered by the sensor device depending on the optical path can be received and evaluated.

11. The forming device according claim 1, wherein the forming device is switchable from an operating state into at least one state different from the operating state depending on an optical path of the radiation and wherein the forming device can be shut off with an interruption of the optical path and wherein the forming device includes a computing device, by which a signal dataset delivered by the sensor device depending on the optical path can be received and evaluated.

12. The forming device according to claim 1, wherein the forming device is switchable from an operating state into at least one state different from the operating state depending on an optical path of the radiation and wherein the forming device includes a computing device, by which a signal dataset delivered by the sensor device depending on the optical path can be received and evaluated and wherein the forming device can be switched into an emergency stop state by the computing device.

13. The forming device according claim 1, wherein the forming device is switchable from an operating state into at least one state different from the operating state depending on an optical path of the radiation and wherein the forming device can be shut off with an interruption of the optical path and wherein the forming device includes a computing device, by which a signal dataset delivered by the sensor device depending on the optical path can be received and evaluated and wherein the forming device can be switched into an emergency stop state by the computing device.

14. The forming device according to claim 1, wherein the forming device is a swing-folding machine.

* * * * *